United States Patent [19]

Yokouchi et al.

[11] Patent Number: 5,117,447
[45] Date of Patent: May 26, 1992

[54] IMAGE INPUT APPARATUS

[75] Inventors: Hisatake Yokouchi, Nishitama; Fumitaka Takahashi, Kashiwa; Hideyuki Sakai, Mobara, all of Japan

[73] Assignee: Hitachi Medical Corporation, Tokyo, Japan

[21] Appl. No.: 466,928

[22] Filed: Jan. 18, 1990

[30] Foreign Application Priority Data

Jan. 25, 1989 [JP] Japan ................................. 1-13951

[51] Int. Cl.$^5$ .............................................. G21K 4/00
[52] U.S. Cl. ........................................ 378/99; 378/190; 358/111; 358/217
[58] Field of Search ................... 378/99, 121, 42, 137, 378/138, 190, 145, 93, 19, 116; 250/370.09; 313/366; 358/217, 218, 219, 111

[56] References Cited

U.S. PATENT DOCUMENTS

| | | | |
|---|---|---|---|
| 4,204,225 | 5/1980 | Mistretta | 358/111 |
| 4,204,226 | 5/1980 | Mistretta et al. | 358/111 |
| 4,704,634 | 11/1987 | Kato et al. | 378/217 |
| 4,809,071 | 2/1989 | Yokouchit et al. | 378/99 |
| 4,852,139 | 7/1989 | Sandrik et al. | 378/99 |

Primary Examiner—Janice A. Howell
Assistant Examiner—Don Wong
Attorney, Agent, or Firm—Antonelli, Terry, Stout & Kraus

[57] ABSTRACT

An image input apparatus including a camera tube having a photoconductive layer onto which an optical image is to be projected, a cathode for emitting an electron beam for scanning the photoconductive layer, a control electrode for controlling a beam current of the electron beam emitted from the cathode in accordance with a control voltage, and a mesh electrode having a frame, the apparatus further including a deflecting circuit for periodically deflecting the electron beam to scan the photoconductive layer. The deflecting circuit periodically deflects the electron beam to scan an area outside a restricted scanning area determined by the frame of the mesh electrode. A beam current control circuit is further added, if necessary, for generating a control voltage and applying the control voltage to the control electrode to control the beam current of the electron beam such that the electron beam does not collide with the frame of the mesh electrode during a period in which the electron beam scans the area outside the restricted scanning area.

22 Claims, 5 Drawing Sheets

IMAGE INPUT APPARATUS

BACKGROUND OF THE INVENTION

The present invention relates to an image input apparatus such as a television camera. The present invention also relates to an apparatus using a television camera as an image input apparatus and, more particularly, to an X-ray fluoroscopic and radiographic apparatus such as, for example, a real-time digital radiographic apparatus (hereinunder referred to as a "real-time DR apparatus") for inputting an X-ray image in real time, processing the image, and providing an image for diagnosis.

In the field of an X-ray image diagnosis apparatus for medical use, a DR apparatus for converting an X-ray image into an electric signal, processing the digital data obtained by subjecting the electric signal to A/D conversion, and displaying the processed image for diagnosis has recently been increasingly developed. Particularly, an X-ray television apparatus composed of an X-ray image intensifier (hereinunder referred to as an "X-ray II") used for obtaining a fluoroscopic image (an image utilized for reducing the X-ray dose per image and chiefly for determining the portion to be photographed) and a television camera has long attracted attention because it is capable of readily producing X-ray image information in the form of an electric signal in real time.

An X-ray television camera is now widely used as an input apparatus of a digital fluorographic apparatus (hereinunder referred to as "DF apparatus"), which is one of the real-time DR apparatuses capable of imaging a blood vessel with an excellent contrast resolution by subtraction between the images read before and after the injection of a contrast medium, as disclosed in U.S. Pat. Nos. 4,204,225 and 4,204,226.

The DF apparatus requires not only the above-described fluoroscopic image but also a radiographic image (an X-ray image provided with a good image quality by increasing the X-ray dosage per image to about 1,000 times the dosage used for fluoroscopic monitoring) which is to be observed by a doctor for diagnosis.

In this case, since the radiographic image is more important, the apparatus is required to have high spatial resolution, contrast resolution and, if necessary, time resolution, and a wide range of an X-ray intensity which enables imaging, in other words, a wide dynamic range, and among these, the demand for a high spatial resolution and a wide dynamic range is strong.

As described above, in a real-time DR apparatus represented by a DF apparatus, the importance of a radiographic image is greater than a fluoroscopic image, so that a television camera used for the real-time DR apparatus is also required to have a high resolution, a wide dynamic range, a high signal-to-noise ratio, a high time resolution, etc.

Among these requirements, it will be understood if the number of frames per second (e.g., generally 30 frames/sec in the case of scanning 525 lines) of the television camera used in the real-time DR apparatus is taken into consideration that the demand for the time resolution is easily dealt with.

In the present invention, measures for dealing with the other three demands are provided.

In order to improve the spatial resolution, the following measures are conventionally adopted.

(i) A high-resolution type camera tube 1 inch in diameter (for example, a Saticon (a registered trademark of Nippon Hoso Kyokai), or in some cases, a Plumbicon (a registered trademark of N. V. Philips Gloeilampenfabrieken)) is used.

(ii) The number of scanning lines is increased from 525 to 1,125, as described in Japanese Patent Application Laid-Open No. 61-113432.

In order to enlarge the dynamic range and improve a signal-to-noise ratio, the following measures are conventionally adopted.

(iii) The necessary frequency band is limited as much as possible so as to reduce the amount of noise.

(iv) The stray capacitances from the camera tube to the preamplifier are reduced so as to reduce the amount of noise.

(v) A signal current from the camera tube is increased.

Among these, since the measures (i) and (iv) largely depend on the characteristics of the device and the parts such as a camera tube, an FET (field-effect transistor) and a resistor adopted, and the mounting technique therefor, the selection and the mounting technique of the device or the parts are taken into adequate consideration.

In the measures (ii) and (iii), the number of scanning lines and the frequency band are necessarily determined by the specification of the DR apparatus, namely, by the number of images photographed per second and the number of pixels per image.

However, with respect to the measure (ii), although it is easy to increase the number of scanning lines itself, it is a problem whether or not the camera tube adopted has a spatial frequency characteristic which corresponds to the increase in the scanning lines.

Use of a high-resolution type camera tube is therefore insufficient, and a camera tube having as large a diameter as possible which allows a large scanning area on the surface of a photoconductive layer or the surface of a target is adopted.

In the measure (v), it is necessary to increase the amount of charge stored on the surface of a photoconductive layer by increasing the amount of incident light falling onto the camera tube. For this purpose, it is necessary to increase the static capacitance $C_s$ of a photoconductive layer or the voltage applied to the surface of a photoconductive layer, in other words, a signal electrode voltage, or the target voltage $V_T$ of the camera tube.

In order to increase $C_s$, the thickness d of a photoconductive layer is reduced, the dielectric constant $\epsilon_s$ is increased and the scanning area $A_2$ is increased.

Among these, d, $\epsilon_s$ and $V_T$ are determined by the characteristics of the photoconductive layer, and $A_s$ is determined by the diameter of the camera tube. Therefore, a camera tube having as large a diameter as possible is used in the same way as in the case of realizing the measure (ii).

As described above, in order to improve the resolution, the dynamic range and the signal-to-noise ratio of a television camera used for a real-time DR apparatus (hereinunder referred to as "television camera for DR"), the diameter of the camera tube is increased and other measures are adopted in the prior art in addition to the selection of a camera tube and the improvement of the circuit and the mounting technique.

As a large-diameter camera tube, a camera tube having a diameter of ⅔ to 1 inch or 1.5 inches, in some cases, is used.

The increase in the diameter of a camera tube, however, is not always advantageous in that the cost of not only the device but also the television camera using the camera tube and further the DR apparatus as a whole is raised.

Still more, new development of a large-diameter camera tube involves a large risk and it is difficult to determine whether or not the thus-developed camera tube will be appropriate.

SUMMARY OF THE INVENTION

Accordingly, it is an object of the present invention to eliminate the above-described problems in the prior art and to provide an image input apparatus having a high resolution, a wide dynamic range and a high signal-to-noise ratio without using a large-diameter camera tube.

To achieve this aim, the present invention provides an image input apparatus comprising a camera tube including a photoconductive layer onto which an optical image is to be projected, a cathode for emitting an electron beam for scanning the photoconductive layer, and a control electrode for controlling a beam current of the electron beam emitted from the cathode in accordance with a control voltage; and a deflection circuit for periodically deflecting the electron beam to scan the photoconductive layer; the deflection circuit periodically deflecting the electron beam to scan an area outside a restricted scanning area determined by an internal structure of the camera tube.

The above and other objects, features and advantages of the present invention will become clear from the following description of the preferred embodiments thereof, taken in conjunction with the accompanying drawings.

DESCRIPTION OF THE PREFERRED EMBODIMENTS

The present invention is characterized in that a beam deflecting means partially scans the area beyond the restricted scanning area which is determined by the structures of a photoconductive layer, an electrode and the like in spite of the corresponding scanning area within which the image quality is ensured for the camera tube in the standard broadcasting system such as an NTSC system, for example, 6.6 mm × 8.8 mm in the case of a ⅔-inch camera tube, 9.5 mm × 12.7 mm in the case of a 1-inch camera tube, and 15.2 mm × 20.3 mm in the case of a 1.5-inch camera tube.

In this case, it is necessary that the input image formed on the surface of the camera tube or the region of interest in the input image is within the restricted scanning area which is determined by the structure of the camera tube, and that the quality of the image obtained is suitable for practical use.

Figure 1A:
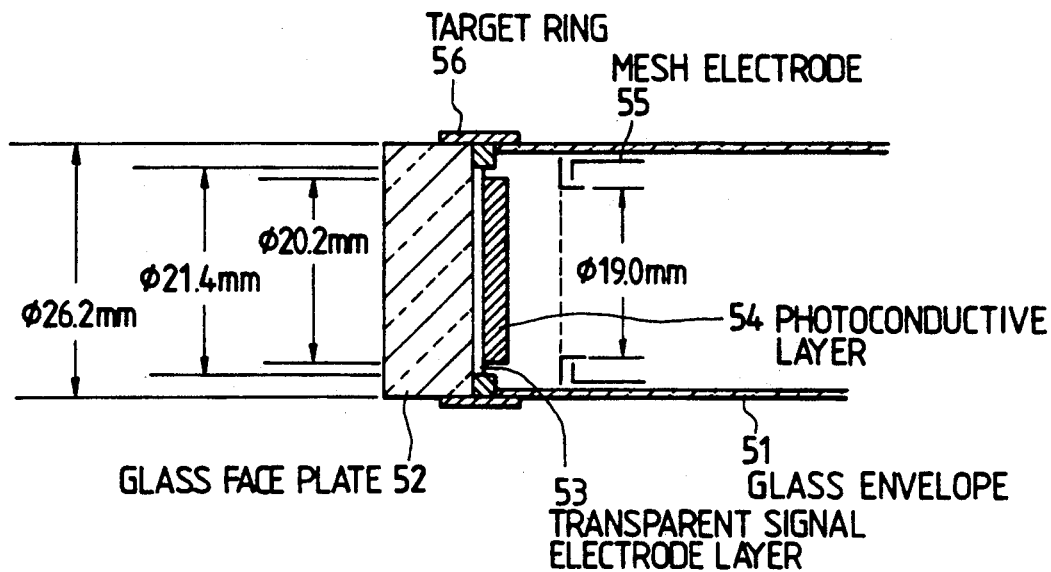
FIG. 1A is a sectional view of the vicinity of a photoconductive layer of a camera tube used for a television camera for a real-time DR apparatus.
Figure 1B:
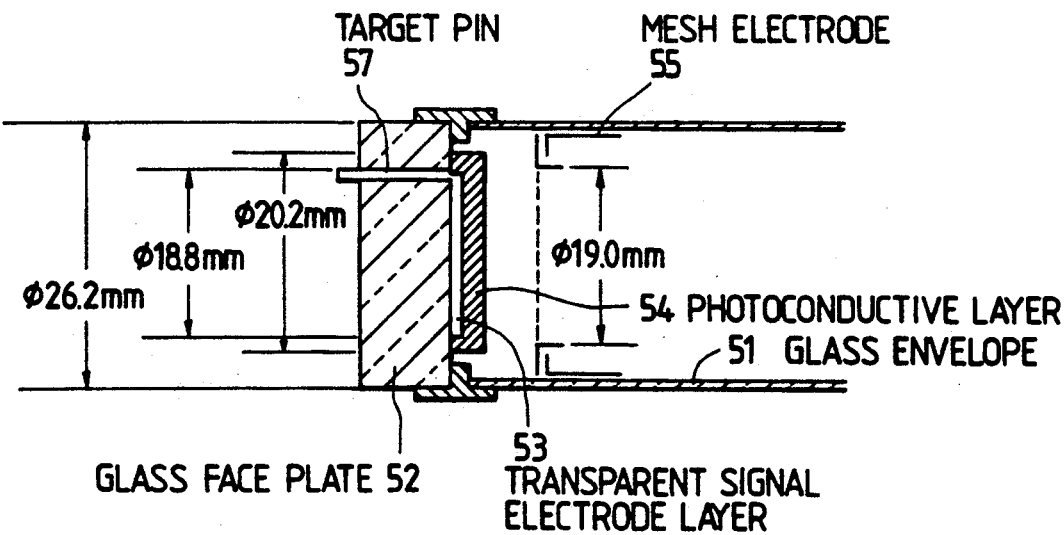
FIG. 1B is a sectional view of the vicinity of a photoconductive layer of another camera tube used for a television camera for a real-time DR apparatus.

FIG. 1A shows an example of the structure of the vicinity of the input surface of an electromagnetic focusing and electromagnetic deflection type (hereinunder referred to as "M—M type") 1-inch camera tube with a target ring A is used as the camera tube in FIG. 1A. The reference numeral 51 represents a glass envelope, 52 a glass face plate, 53 a transparent signal electrode layer, 54 a photoconductive layer, 55 a mesh electrode, and 56 a target ring. In this example, the restricted scanning area which is determined by the structure of the camera tube is determined not by the photoconductive layer 54 having a diameter of 20.2 mm, but by the frame of the mesh electrode 55 having a diameter of 19 mm. In this example, the diameter of the transparent signal electrode layer 53 is 21.4 mm, but in the case of a camera tube with a target pin 57 such as that shown in FIG. 1B, since the diameter of the effective transparent signal electrode layer 53 is 18.8 mm, which is smaller than the diameter of the actual photoconductive layer, due to the position of the target pin 57, the scanning area is determined by the positions of the transparent signal electrode layer 53 and the target pin 57. In the structure of the camera tube shown in FIG. 1B, the same reference numerals are provided for the elements which are the same as those shown in FIG. 1A. In FIGS. 1A and 1B, the symbol $\phi$ represents a diameter.

Figure 2A:
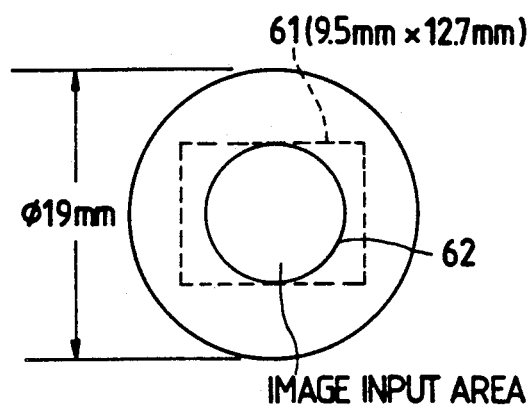
FIG. 2A shows an example of the scanning area of a conventional television camera.
Figure 2B:
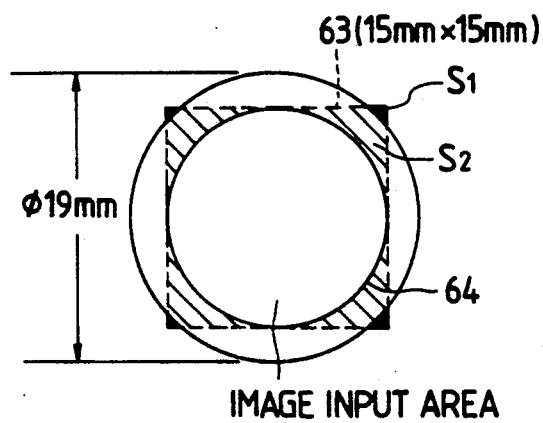
FIGS. 2B and 2C show examples of the scanning area of television cameras in accordance with the present invention.
Figure 2C:
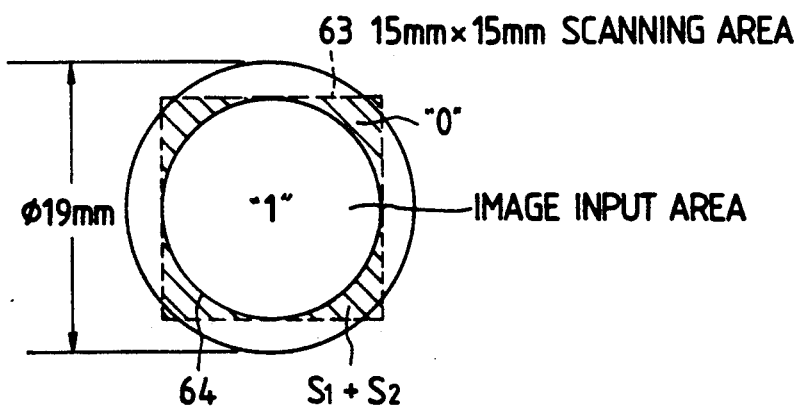

FIGS. 2B and 2C show examples of a scanning area proposed in the present invention. A conventional scanning area 61 is 9.5 mm × 12.7 mm, as shown in FIG. 2A. In the conventional scanning area 61, the scanning area $A_s$ is small. For example, if a circular image such as the image output from an X-ray II is taken into consideration, it is necessary that the circular image 62 is within the scanning area, so that the diameter of the image forming surface is 9.5 mm and the area $A_c$ thereof is 70.9 mm$^2$.

Even if the scanning area is restricted to the diameter of the mesh, namely, 19 mm, in other words, even if the maximum restricted scanning area which is determined by the structure of the camera tube is used for square scanning, the scanning domain is 13.4 mm × 13.4 mm and is limited to 13 mm × 13 mm in consideration of a slight margin. In this case, the diameter of the image forming surface for a circular image is 13 mm, and the area $A_c$ thereof is 132.7 mm$^2$.

On the other hand, in the present invention, a square 63 is scanned by an electron beam beyond the restricted scanning area (the range equivalent to the mesh diameter 19 mm in FIG. 2B) which is determined by the structure of the camera tube, as shown in FIG. 2B. If the circular image of the X-ray II is projected onto the maximum area which corresponds to the mesh diameter and scanned, the necessary domain for beam scanning is 19 mm×19 mm. However, the suitable scanning domain 63 for the beam deflecting means is 15 mm×15 mm to 16 mm×16 mm in consideration of the image quality obtained. In the following explanation, the scanning domain 63 is assumed to be 15 mm×15 mm (diagonal: 21.2 mm).

In this case, the circle 64 (diameter: 15 mm) inscribed in the square scanning area 63 constitutes the useful image input area, and the area $A_c$ thereof is 176.7 mm$^2$.

This useful image input area is substantially the same as the useful image input area obtained in the above-described scanning area within which the image quality is ensured for a 1.5-inch camera tube and having a diameter of 15.2 mm. This fact means that a 1-inch camera tube is capable of inputting an image of substantially the same degree as a 1.5-inch camera tube does. The image forming area of a circular image obtained within the scanning area within which the image quality is ensured for a 1-inch camera tube is 70.9 mm$^2$ in the prior art. In contrast, the image scanning area in the present invention is 176.7 mm$^2$, which is about 2.5 times as large as that in the prior art.

This means that the scanning area proposed in the present invention greatly contributes to the improvement of the resolution, the dynamic range and the signal-to-noise ratio.

The above-described enlargement of the scanning area is easily achieved by increasing the output of a deflecting and amplifying system and there is almost no need to change a conventional television camera for DR.

When the scanning area is enlarged to 15 mm×15 mm as described above, an electron beam passes a control electrode $G_1$, an accelerating electrode $G_2$, a focusing electrode $G_3$ and a mesh electrode $G_4$ (see FIG. 5) and reaches the surface of the target in an M—M type Saticon, but the electron beam does not reach the surface of the target in the vicinity of the four corners which are beyond the diameter of the mesh, namely, 19 mm, and collides against the frame of the the mesh electrode.

Since a retarding electric field is generally generated between the mesh electrode and the surface of the target, the energies of the electrons which reach the surface of the target are so controlled as to become very small, namely, to make a soft landing on the surface of the target. However, the electrons which collide against the frame of the mesh electrode have a certain degree of energy when colliding, thereby emitting secondary electrons from the frame of the mesh electrode and possible breaking the electrode.

To prevent this, the present invention also provides a means for controlling the voltage $E_{c1}$ (see FIG. 5) applied to the control electrode $G_1$ so as to prevent the electron beam from reaching an unnecessary area on the mesh electrode $G_4$ or the surface of the target.

The controlling method is as follows. In the scanning area 63 shown in FIG. 2B, a signal is output for controlling the voltage so as to cut the electron beam, for example, in the area $s_1$ which is defined by the mesh electrode or the area $s_1+s_2$ which is outside the scanning area necessary for inputting a circular image.

Figure 5:
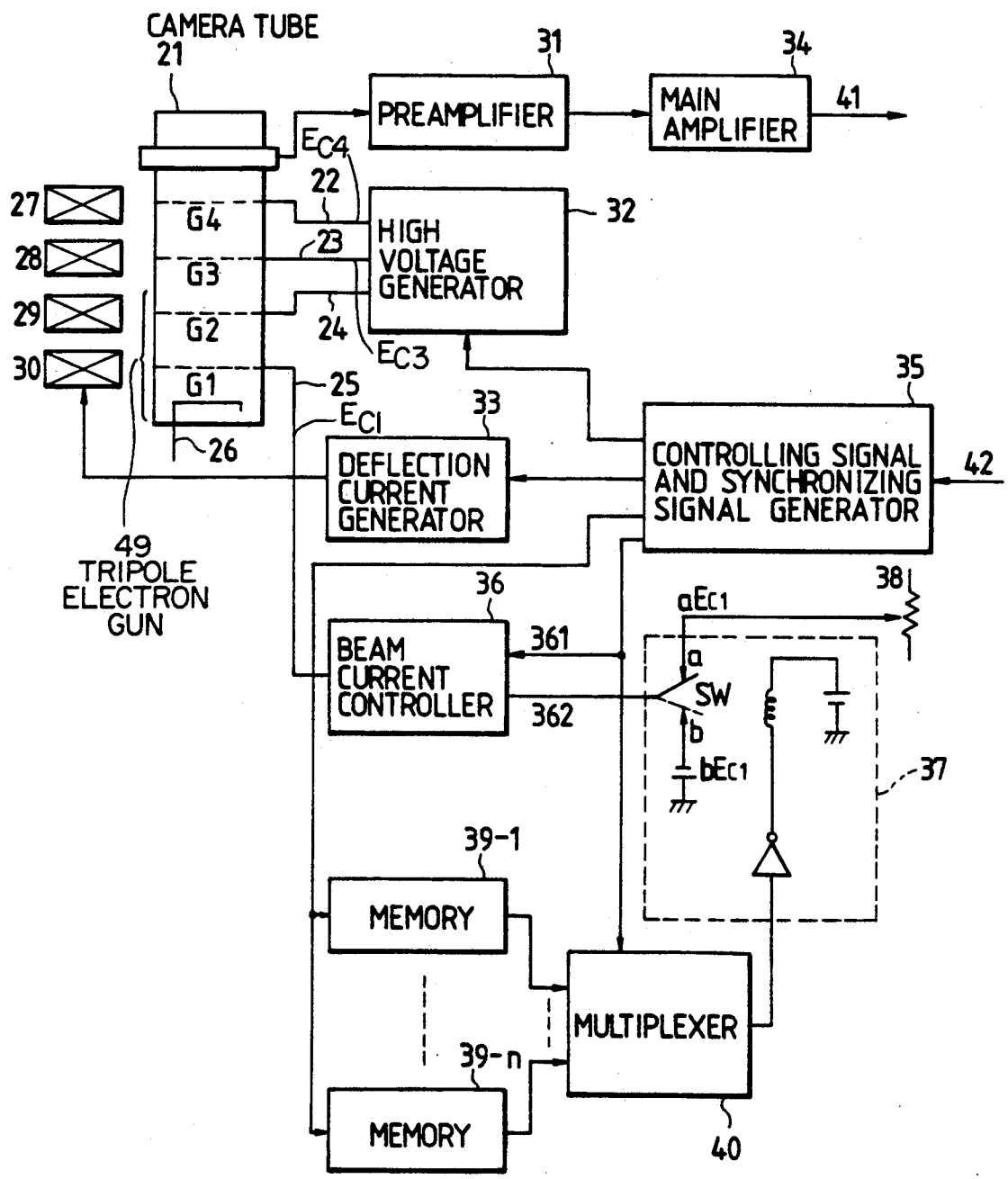
FIG. 5 is a block diagram of an embodiment of an image input apparatus according to the present invention, which is an example of a television camera used for the X-ray fluoroscopic and radiographic apparatus shown in FIG. 4.

This method is realized by preparing a two-dimensional memory with information indicating the scanning area stored therein in advance, reading the data synchronously with the scanning, as shown in FIG. 5 and controlling a switch for the voltage $E_{c1}$ so as to change over between a voltage $bE_{c1}$ for cutting the electron beam and a voltage $aE_{c1}$ for turning on the electron beam in accordance with the output of the memory.

In the case of a Saticon tube, however, according to the experiments of the present inventors, even if the electron beam collided against the frame of the mesh electrode, the mesh electrode was not broken. In this case, the means for on/off control of the electron beam is dispensed with, and an increase in the capacity of the mesh electrode current source suffices.

When a television camera for DR has a multiplicity of scanning modes, a real-time DR apparatus which effectively utilizes the television camera sometimes needs to change the scanning area of the electron beam in each mode. This is easily realized either by preparing the memory with the data for controlling the voltage $E_{c1}$ stored therein for each mode or by changing the contents of the memory in correspondence with the current scanning mode.

In the case of square scanning by a 1-inch camera tube, the scanning area is (1) 9.5 mm×9.5 mm in a scanning area within which the image quality is ensured, (2) 13 mm×13 mm in the maximum restricted scanning area which is determined by the structure of the camera tube, and (3) 15 mm×15 mm to 19 mm×19 mm in the scanning area proposed in the present invention. In the following explanation, the scanning area is assumed to be 15 mm×15 mm. The circular images inscribed in the respective scanning areas have diameters of 9.5 mm, 13 mm and 15 mm, respectively, so that the areas $A_c$ thereof are 70.9 mm$^2$, 132.7 mm$^2$, and 176.7 mm$^2$, respectively.

The effect of the enlargement of the scanning area proposed in the present invention will now be described.

Figure 3:
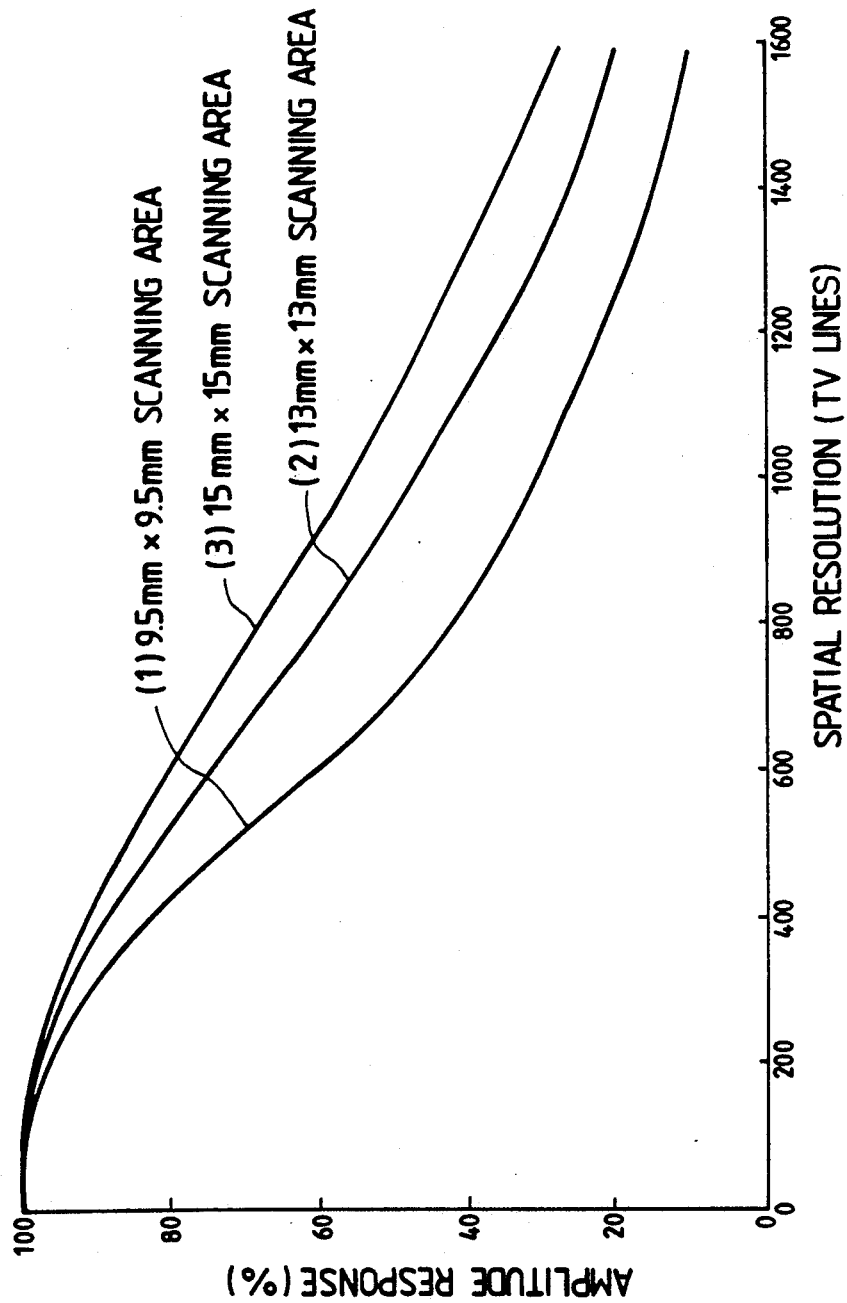
FIG. 3 is a graph of an amplitude response showing the spatial resolution of a television camera according to the present invention which is used in a 1,000-line scanning mode.

If the amplitude response (hereinunder referred to as "AR") of a television camera for DR is improved, the resolution is enhanced FIG. 3 shows the AR of a television camera which has scanned the three kinds of scanning areas (1) to (3) described above in a 1,000-line scanning mode (number of scanning lines: 1,050, number of repetitive frames 7.5/sec, progressive scanning). The AR values in the respective scanning areas (1) to (3) at 800 TV lines are 41%, 59% and 67%, respectively. It is observed that by adopting the means in accordance with the present invention, the AR value is improved to such a great extent as about 1.63 times the AR value obtained by scanning the scanning area of 9.5 mm×9.5 mm. That is, the resolution is improved to that extent.

The dynamic range is a ratio of the dark current and the maximum signal current obtainable in a camera tube, and the signal to noise-ratio is the ratio of a signal current to a noise current which is the synthesis of the electronic circuit noise in a frequency band and the shot noise due to the signal current. That is, if the maximum signal current obtainable from the camera tube is increased, the improvement of the dynamic range and the signal-to-noise ratio is achieved.

If it is assumed that the static capacitance of the photoconductive layer is $C_s$, the target voltage is $V_T$, the number of repetitive frames is $n_f$, and the ratio of the scanning time $t_f$ required for repeating one frame and the scanning time $t_c$ required for scanning the above-described scanning area is $\alpha_c$ ($=t_c/t_f$), the maximum signal current $i_{smax}$ is represented by the following formula:

$$i_{smax} \alpha C_s V_T n_f / \alpha_c \quad (1)$$

If it is assumed that the thickness of the photoconductive layer is d, the dielectric constant is $\epsilon_s$ and the area of the square scanning area is $A_s$, the following formula holds:

$$C_s = \epsilon_0 \epsilon_s A_s / d \quad (2)$$

wherein $\epsilon_0 = 8.84 \times 10^{-12}$ F/m. Therefore, the following formula holds:

$$i_{smax} \alpha \epsilon_0 \epsilon_s A_s V_T n_f / (d \cdot \alpha_c) \quad (3)$$

If the camera tube and the scanning system adopted are determined, $\epsilon_s$, d, $n_f$ and $\alpha_c$ in the formula (3) are given, so that the following formula holds:

$$i_{smax} \alpha A_s V_T \quad (4)$$

Since $V_T$ is determined by the conditions for using the camera tube, the formula (4) becomes as follows:

$$i_{smax} \alpha A_s \quad (5)$$

Since the static capacitance of the circular image area inscribed in the square scanning area is represented by the following formula (the area of the circular image area is $A_c$):

$$C_c = \epsilon_0 \epsilon_s A_c / d \quad (6)$$

the maximum signal current $i_{cmax}$ obtainable from the circular image area is represented by the following formula similar to the formula (5):

$$i_{cmax} \alpha A_c \quad (7)$$

That is, according to the present invention, the maximum signal current obtainable from a circular image area is about 2.5 times the value obtained when scanning the area of 9.5 mm × 9.5 mm, and the dynamic range and the signal-to-noise ratio are improved to that extent.

The present invention in which the area beyond the scanning area determined by the structure of a camera tube is scanned involves a fear of producing a deleterious influence such as emission of a large amount of secondary electrons or the damage of the structure at the peripheral portions of the surface of the target or the mesh electrode depending upon the type and the structure of the camera tube used. To prevent such a deleterious influence in the present invention, the voltage $E_{c1}$ applied to the control electrode $G_1$ for controlling the electron beam of the camera tube is controlled in correspondence with the scanning position. In other words, there is provided a means for normally applying a deflection signal for the electron beam to the camera tube but lowering the voltage $E_{c1}$ slightly before the scanning position at which the electron beam exerts the deleterious influence so as to cut off the electron beam.

Figure 4:
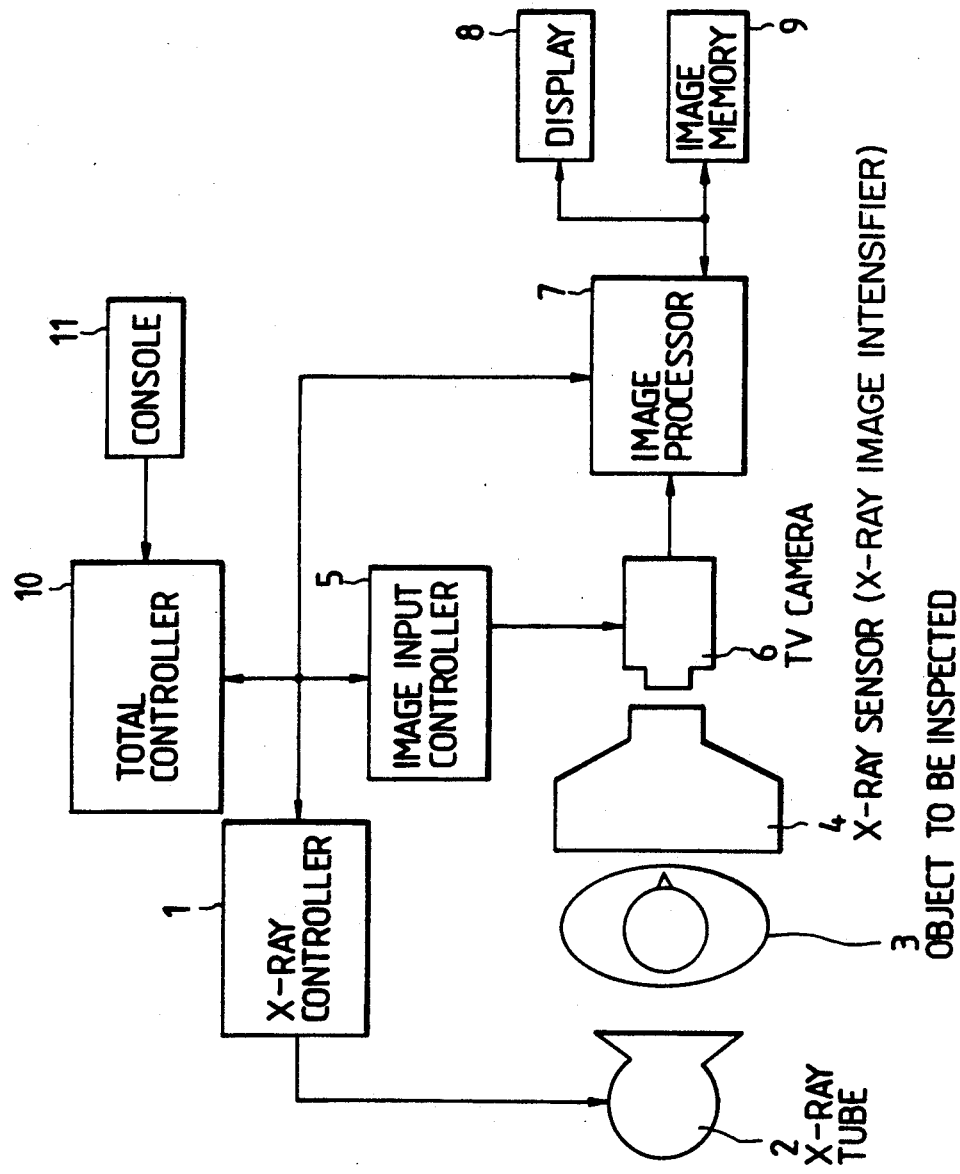
FIG. 4 is a block diagram of an embodiment of an X-ray fluoroscopic and radiographic apparatus according to the present invention.

FIG. 4 is a block diagram of the structure of an embodiment of the present invention, a real-time DR apparatus, namely, an X-ray fluoroscopic and radiographic apparatus. In FIG. 4, the reference numeral 1 represents an X-ray controller for controlling the generation of an X-ray, 2 an X-ray tube for generating and radiating an X-ray, 3 an object to be inspected (body to be inspected), 4 an X-ray sensor (e.g., an X-ray II) for converting the X-ray projection of the object 3 into an optical image, 6 a television camera for DR for imaging the output image from the sensor 4 for television, 5 an image input controller for controlling the television camera 6, 7 an image processor for processing, displaying and memory controlling the output signal from the television camera 6 after the output image is subjected to A/D conversion, 8 a display for displaying the image, 9 an image memory for storing the output image of the image processor 7, 10 a total controller for synthetically controlling the X-ray controller 1, the image input controller 5 and the image processor 7, and 11 a console for inputting various commands of the operator to the total controller 10.

When a command for starting fluoroscopic monitoring and radiographic imaging is input to the console 11, the total controller 10 outputs an X-ray generation instruction to the X-ray controller 1, an image input start instruction to the image input controller 5, and an image read start instruction to the image processor 7, respectively. When the X-ray controller 1 receives the X-ray generation instruction, the X-ray controller 1 instructs the X-ray tube to generate an X-ray in accordance with the content of the instruction, whereby the X-ray tube 2 radiates an X-ray onto the object 3. Various X-ray projections of the object 3 are formed on the X-ray sensor 4 in correspondence with the condition of the body. The X-ray sensor 4 converts an X-ray image in real time and outputs an optical image every time an X-ray projection is input.

When the image input controller 5 receives the image input start instruction, the image input controller 5 outputs an operation mode instruction and an image input start instruction to the television camera 6 in accordance with the content of the instruction. The television camera 6 has a mode corresponding to the X-ray fluoroscopic monitoring mode and a mode corresponding to the radiographic imaging mode. In a fluoroscopic monitoring mode, the television camera 6 operates in a 500- or 1,000-line scanning mode at 30 frames per second. In this case, since the X-ray radiation exposure per frame is small and the amount of incident light to the television camera 6 is small, the television camera 6 is operated with the gain of the amplifier thereof increased. In contrast, in a radiographic imaging mode, the television camera 6 operates in not less a 1,000-line scanning mode. For example, in a 1,000-line scanning mode, the television camera operates at 7.5 frames per second. In this case, since the X-ray radiation exposure per frame is as large as about 1,000 times the radiation exposure in a fluoroscopic monitoring mode and the amount of incident light to the television camera 6 is also large, the gain of the amplifier of the television camera 6 is set at the optimum value, so that the signal-to-noise ratio of the image obtained is good and a good image quality is also obtained.

When the television camera 6 receives an image input instruction from the image input controller 5, the television camera 6 starts to image the output image of the sensor for television and to input the television image to the image processor 7 in the controlled operation mode. When the image processor 7 receives the image read start instruction from the total controller 10, the image processor 7 reads from the instruction whether or not processing is necessary, what the content of the instruction and the displaying conditions are, and whether or not storage is necessary, executes the necessary processings in accordance with the instruction, and outputs instructions to the display 8 and the image memory 9. The display 8 displays the image under the displaying conditions instructed by the image processor 7. It is also possible to manually control the displaying conditions to a certain extent.

The image memory 9 stores the image data only when it receives a storage instruction from the image processor 7. The image memory 9 can naturally store both an analog image and a digital image by appropriately selecting a memory medium and a memory system.

FIG. 5 is a block diagram of an example of the television camera 6 used for the apparatus shown in FIG. 4. The reference numeral 21 represents an electromagnetic focusing and electromagnetic deflection type 1-inch camera tube with a tripole electron gun 49, 22 a mesh electrode $G_4$, 23 a beam focusing electrode $G_3$, 24 an accelerating electrode $G_2$, 25 a beam control electrode $G_1$, 26 a cathode, 27 a focusing coil, 28 an alignment coil, 29 a horizontal deflection coil, 30 a vertical deflection coil, 31 a preamplifier, 32 a high voltage generator, 33 a deflection current generator, 34 a main amplifier and 35 a controlling signal and synchronizing signal generator. Tripole electron gun 49 comprises cathode 26, beam control electrode $G_1$ (25), and accelerating electrode $G_2$ (24). In this embodiment, the high voltage generator 32 adjusts the voltage $E_{c4}$ applied to the mesh electrode $G_4$ to not less than 1,400 V and the voltage $E_{c3}$ applied to the beam focusing electrode $G_3$ to about 1,000 V.

The reference numeral 36 represents a beam current controller. The beam current controller 36 generally generates a control voltage $bE_{c1}$ for cutting off the beam during the retracing period of the electron beam, or a blanking period which is a period from the end of the retracing period until the beam scanning is stabilized on on the basis of the timing signal applied to a terminal 361 from the controlling signal and synchronizing signal generator 35, and generates a control voltage $aE_{c1}$ applied to a terminal 362 so that a predetermined current flows during the imaging period, namely, the period during which the beam scans a predetermined square image portion. In this embodiment, however, the control voltage $aE_{c1}$ with the value adjusted by a variable resistor 38 is not applied directly to the terminal 362, but a voltage selected by a switch 37 which is controlled by the data read out of memories 39-1 to 39-n is applied, whereby the beam is generated only while the image input area shown in FIGS. 2B and 2C is scanned. More specifically, beam on/ beam off data corresponding to the respective scanning lines are stored in the memories 39-1 to 39-n, and the value "1" is stored for the circular image input area 64 in FIG. 2C and the value "0" is stored for the hatched area $s_1+s_2$. The memories 39-1 to 39-n are read in parallel to each other by the control of the controlling signal and synchronizing signal generator 35 synchronously with the beam scanning, and only the signal read from the memory corresponding to the current scanning line is selected by a multiplexer 40. While the selected signal is "0", the switch 37 is in contact with b and the control signal $bE_{c1}$ for cutting off the electron beam is applied to the terminal 362 of the beam current controller 36 and transmitted to the beam control electrode $G_1$ of a camera tube 21, thereby cutting off the beam. On the other hand, when the signal selected by the multiplexer 40 is "1", the switch is brought into contact with a and the control signal $aE_{c1}$ is applied to the terminal 362 of the beam current controller 36, thereby generating a beam current for reading the image These additional elements 37, 39-1 to 39-n and 40 prevent the generation of an electron beam in the unnecessary scanning domain, explained with reference to FIG. 2B such that an electron beam is only generated while the circular image input area is scanned.

In the case of adopting an apparatus for changing over the scanning mode to, for example, a 500-, 1,000- or 2,000-line scanning mode, memories for, for example, 2,000 lines are prepared, and the order of selection is designated in the multiplexer 40 in correspondence with the instruction of a 500-, 1,000- or 2,000-line scanning mode. Alternatively, a memory may be prepared for each scanning mode.

In the above-described embodiments, when a circular image is input, the square in which the circle is inscribed is set as a scanning domain of the beam deflecting means, but the present invention is applicable to the case of inputting an elliptic image. In this case, the scanning domain of the beam deflecting means is not a square but a rectangle in which the ellipse is inscribed.

As described above, according to the present invention, by scanning the area beyond the scanning area determined by the photoconductive layer of a camera tube or the structure of an electrode, the scanning area of the image input area is enlarged, thereby achieving the improvement of the resolution of a real-time DR apparatus, the dynamic range and the signal-to-noise ratio. It is therefore unnecessary to use an expensive large-diameter camera tube in place of the camera tube currently used which is available at low cost. Thus, the present invention greatly contributes to reduction in cost of the apparatus.

The advantages of the present invention are indissoluble even when a large-diameter camera tube becomes economically available in future.

In an embodiment of the present invention, since a measure for precluding the possibility of the deterioration of the characteristics of a camera tube, damage of an electrode, etc. which may be caused in the case of scanning the area beyond the above-described scanning area is provided, the various advantages described above are ensured.

While there have been described what are at present considered to be preferred embodiments of the invention, it will be understood that various modifications may be made thereto, and it is intended that the appended claims cover all such modifications as fall within the true spirit and scope of the invention.

What is claimed is:

1. An image input apparatus comprising:
   a camera tube including a photoconductive layer onto which an optical image is to be projected, a cathode for emitting an electron beam for scanning said photoconductive layer, and a control electrode for controlling a beam current of said electron beam emitted from said cathode in accordance with a control voltage; and
   deflecting means for periodically deflecting said electron beam to scan said photoconductive layer, said deflecting means periodically deflecting said electron beam to scan an area outside a restricted scanning area determined by an internal structure of said camera tube;

wherein said optical image is to be projected onto said photoconductive layer in the form of an ellipse, and wherein said deflecting means periodically deflects said electron beam to scan a rectangular area in which said ellipse is inscribed.

2. An image input apparatus according to claim 1, further comprising beam current controlling means for generating a control voltage and applying said control voltage to said control electrode to control said beam current of said electron beam such that said electron beam does not reach said photoconductive layer during a period in which said electron beam scans an area outside said ellipse.

3. An image input apparatus according to claim 1, wherein said camera tube further includes an electrode disposed near said photoconductive layer, and further comprising beam current controlling means for generating a control voltage and applying said control voltage to said control electrode to control said beam current of said electron beam such that said electron beam does not collide with the electrode disposed near said photoconductive layer during a period in which said electron beam scans an area outside said ellipse.

4. An image input apparatus comprising:
a camera tube including a photoconductive layer onto which an optical image is to be projected, a cathode for emitting an electron beam for scanning said photoconductive layer, a control electrode for controlling a beam current of said electron beam emitted from said cathode in accordance with a control voltage, and a mesh electrode having a frame; and
deflecting means for periodically deflecting said electron beam to scan said photoconductive layer, said deflecting means periodically deflecting said electron beam to scan an area outside a restricted scanning area determined by the frame of said mesh electrode.

5. An image input apparatus according to claim 4, further comprising beam current controlling means for generating a control voltage and applying said control voltage to said control electrode to control said beam current of said electron beam such that said electron beam does not collide with the frame of said mesh electrode during a period in which said electron beam scans said area outside said restricted scanning area.

6. An image input apparatus according to claim 4, wherein said optical image is to be projected onto said photoconductive layer in the form of a circle, and wherein said deflecting means periodically deflects said electron beam to scan a square area in which said circle is inscribed.

7. An image input apparatus according to claim 6, further comprising beam current controlling means for generating a control voltage and applying said control voltage to said control electrode to control said beam current of said electron beam such that said electron beam does not reach said photoconductive layer during a period in which said electron beam scans an area outside said circle.

8. An image input apparatus according to claim 6, further comprising beam current controlling means for generating a control voltage and applying said control voltage to said control electrode to control said beam current of said electron beam such that said electron beam does not collide with the frame of said mesh electrode during a period in which said electron beam scans an area outside said circle.

9. An image input apparatus according to claim 4, wherein said optical image is to be projected onto said photoconductive layer in the form of an ellipse, and said deflecting means periodically deflects said electron beam to scan a rectangular area in which said ellipse is inscribed.

10. An image input apparatus according to claim 9, further comprising beam current controlling means for generating a control voltage and applying said control voltage to said control electrode to control said beam current of said electron beam such that said electron beam does not reach said photoconductive layer during a period in which said electron beam scans an area outside said ellipse.

11. An image input apparatus according to claim 9, further comprising beam current controlling means for generating a control voltage and applying said control voltage to said control electrode to control said beam current of said electron beam such that said electron beam does not collide with the frame of said mesh electrode during a period in which said electron beam scans an area outside said ellipse.

12. An X-ray fluoroscopic and radiographic apparatus comprising:
an X-ray source for irradiating an object to be inspected with X-rays to produce an X-ray projection of said object;
an X-ray sensor for converting the X-ray projection of said object into an optical image;
a television camera including a camera tube having a photoconductive layer onto which said optical image from said X-ray sensor is projected, a cathode for emitting an electron beam for scanning said photoconductive layer, and a control electrode for controlling a beam current of said electron beam emitted from said cathode in accordance with a control voltage, said television camera further including deflecting means for periodically deflecting said electron beam to scan said photoconductive layer, said deflecting means periodically deflecting said electron beam to scan an area outside a restricted scanning area determined by an internal structure of said camera tube;
an image processor for processing an image signal output from said television camera;
an image memory for storing a signal output from said image processor; and
a display for displaying said signal output from said image processor;
wherein said optical image from said X-ray sensor is projected onto said photoconductive layer in the form of an ellipse, and wherein said deflecting means periodically deflects said electron beam to scan a rectangular area in which said ellipse is inscribed.

13. An X-ray fluoroscopic and radiographic apparatus according to claim 12, further comprising beam current controlling means for generating a control voltage and applying said control voltage to said control electrode to control said beam current of said electron beam such that said electron beam does not reach said photoconductive layer during a period in which said electron beam scans an area outside said ellipse.

14. An X-ray fluoroscopic and radiographic apparatus according to claim 12, wherein said camera tube further has an electrode disposed near said photoconductive layer, and further comprising beam current controlling means for generating a control voltage and applying said control voltage to said control electrode to control said beam current of said electron beam such that said electron beam does not collide with the electrode disposed near said photoconductive layer during a period in which said electron beam scans an area outside said ellipse.

15. An X-ray fluoroscopic and radiographic apparatus comprising:
   an X-ray source for irradiating an object to be inspected with X-rays to produce an X-ray projection of said object;
   an X-ray sensor for converting the X-ray projection of said object into an optical image;
   a television camera including a camera tube having a photoconductive layer onto which said optical image is projected, a cathode for emitting an electron beam for scanning said photoconductive layer, a control electrode for controlling a beam current of said electron beam emitted from said cathode in accordance with a control voltage, and a mesh electrode having a frame, said television camera further including deflecting means for periodically deflecting said electron beam to scan said photoconductive layer, said deflecting means periodically deflecting said electron beam to scan an area outside a restricted scanning area determined by the frame of said mesh electrode;
   an image processor for processing an image signal output from said television camera;
   an image memory for storing a signal output from said image processor; and
   a display for displaying said signal output from said image processor.

16. An X-ray fluoroscopic and radiographic apparatus according to claim 15, further comprising beam current controlling means for generating a control voltage and applying said control voltage to said control electrode to control said beam current of said electron beam such that said electron beam does not collide with the frame of said mesh electrode during a period in which said electron beam scans said area outside said restricted scanning area.

17. An X-ray fluoroscopic and radiographic apparatus according to claim 15, wherein said optical image from said X-ray sensor is projected onto said photoconductive layer in the form of a circle, and wherein said deflecting means periodically deflects said electron beam to scan a square area in which said circle is inscribed.

18. An X-ray fluoroscopic and radiographic apparatus according to claim 17, further comprising beam current controlling means for generating a control voltage and applying said control voltage to said control electrode to control said beam current of said electron beam such that said electron beam does not reach said photoconductive layer during a period in which said electron beam scans an area outside said circle.

19. An X-ray fluoroscopic and radiographic apparatus according to claim 17, further comprising beam current controlling means for generating a control voltage and applying said control voltage to said control electrode to control said beam current of said electron beam such that said electron beam does not collide with the frame of said mesh electrode during a period in which said electron beam scans an area outside said circle.

20. An X-ray fluoroscopic and radiographic apparatus according to claim 15, wherein said optical image from said X-ray sensor is projected onto said photoconductive layer in the form of an ellipse, and wherein said deflecting means periodically deflects said electron beam to scan a rectangular area in which said ellipse is inscribed.

21. An X-ray fluoroscopic and radiographic apparatus according to claim 20, further comprising beam current controlling means for generating a control voltage and applying said control voltage to said control electrode to control said beam current of said electron beam such that said electron beam does not reach said photoconductive layer during a period in which said electron beam scans an area outside said ellipse.

22. An X-ray fluoroscopic and radiographic apparatus according to claim 20, further comprising beam current controlling means for generating a control voltage and applying said control voltage to said control electrode to control said beam current of said electron beam such that said electron beam does not collide with the frame of said mesh electrode during a period in which said electron beam scans an area outside said ellipse.

* * * * *